US012393449B2

(12) United States Patent
Yucel

(10) Patent No.: US 12,393,449 B2
(45) Date of Patent: *Aug. 19, 2025

(54) COMPUTER-BASED SYSTEMS CONFIGURED FOR PERSISTENT STATE MANAGEMENT AND CONFIGURABLE EXECUTION FLOW AND METHODS OF USE THEREOF

(71) Applicant: Capital One Services, LLC, McLean, VA (US)

(72) Inventor: Emre Yucel, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 305 days.

This patent is subject to a terminal disclaimer.

(21) Appl. No.: 18/061,714

(22) Filed: Dec. 5, 2022

(65) Prior Publication Data

US 2023/0107334 A1    Apr. 6, 2023

Related U.S. Application Data

(63) Continuation of application No. 16/874,357, filed on May 14, 2020, now Pat. No. 11,520,624.

(51) Int. Cl.
    *G06F 9/46*     (2006.01)
    *G06F 9/445*    (2018.01)
    *G06F 9/455*    (2018.01)
    *G06F 9/48*     (2006.01)

(52) U.S. Cl.
    CPC ........ *G06F 9/4881* (2013.01); *G06F 9/44505* (2013.01); *G06F 9/45558* (2013.01); *G06F 2209/486* (2013.01)

(58) Field of Classification Search
    CPC ............. G06F 9/4881; G06F 9/44505; G06F 9/45558; G06F 2209/486
    See application file for complete search history.

(56) References Cited

U.S. PATENT DOCUMENTS

| 7,716,274 B1 | 5/2010 | Kumar | |
|---|---|---|---|
| 2003/0195921 A1* | 10/2003 | Becker | H04L 9/40 709/200 |
| 2013/0007517 A1* | 1/2013 | Eberwein | G06F 11/1438 714/15 |

(Continued)

*Primary Examiner* — Diem K Cao
(74) *Attorney, Agent, or Firm* — Greenberg Traurig, LLP

(57) ABSTRACT

Embodiments of an activities-defined software object execution management platform include instantiation of a program based on a program configuration, including customizable scheduling configurations and execution steps of program stages. A current state of the program is received from a state persistence storage. A stage configuration of the current stage is configured. A program execution readiness is determined to identify when to execute the current stage of the program based on an execution configuration and program-specific parameterized values. The current stage is instantiated based on the program execution readiness. An execution status of the stage is determined based on a validation configuration. A previous stage is determined to rollback before the current stage based on the execution status and a rollback configuration. The current state is updated in the persistent storage based on the execution of the state step to form a subsequent state of the program.

20 Claims, 7 Drawing Sheets

(56) References Cited

U.S. PATENT DOCUMENTS

2016/0253199 A1* 9/2016 Thomas .................. H04L 67/01
            726/7
2018/0181383 A1* 6/2018 Jagannath ........... G06F 9/45558
2018/0321918 A1  11/2018 McClory et al.

* cited by examiner

COMPUTER-BASED SYSTEMS CONFIGURED FOR PERSISTENT STATE MANAGEMENT AND CONFIGURABLE EXECUTION FLOW AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of persistent state management and configurable execution flow.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

Cloud and virtual machine orchestration can be subject to interruptions and failures in the processing of tasks. Recovery from such interruptions and failures can be hard to do due to inadequate state tacking and management and hard-coded task execution and monitoring.

SUMMARY OF DESCRIBED SUBJECT MATTER

In some embodiments, the present disclosure provides an exemplary technically improved computer-based method that includes at least the following steps of instantiating, by at least one processor, at least one program based on at least one program configuration, where the at least one program configuration includes: at least one customizable scheduling configuration, and at least one execution step of a current execution stage of the at least one program. The at least one processor receives a current execution state of the at least one program from a state persistence storage. The at least one processor determines a stage configuration of the current execution stage of the at least one program, where the stage configuration includes: a dependency configuration, an execution configuration, a validation configuration, and a rollback configuration; where the dependency configuration includes a sequence of alphanumerical groups for locating dependencies according to pattern matching between the sequence of alphanumerical groups and a plurality of parameterized file paths associated with at least one data unit of the state persistence storage, where the plurality of parameterized file paths saved in a form of a variables map, where the dependencies include resources for execution of the current execution stage, where the execution configuration defines steps for executing the current execution stage, where the validation configuration defines steps for validating execution of the current execution stage, where the rollback configuration defines steps for recovering from a failed execution of the current execution stage. The at least one processor determines a program execution readiness to identify when to execute the current execution stage of the at least one program associated with the current execution state based on the execution configuration and a plurality of program-specific parameterized values populated from the variables map. The at least one processor instantiates the current execution stage of the at least one program based on the program execution readiness. The at least one processor determines an execution status of the at least one execution stage based on the validation configuration. The at least one processor determines to rollback to a previous execution stage before the current execution stage based on the execution status and the rollback configuration, and updates the current execution state of the at least one program in the at least one data unit of the persistent storage based on the execution of the at least one state step to form a subsequent execution state of the at least one program.

In some embodiments, the present disclosure provides an exemplary technically improved computer-based method that includes at least the following steps of searching, by at least one processor, a data unit of state persistence storage by pattern matching dependency files with one or more sequences of prefixes associated with a stage of a program, where the one or more sequences of prefixes includes at least one prefix element according to a customizable configuration. The at least one processor generates a variables map based on the sequence of prefixes. The at least one processor compares file paths and file names of dependency files in the state persistence storage with the variables map. The at least one processor identifies the dependency of the stage of the program in the state persistence storage based on matched files paths and matched file names. The at least one processor stores the dependency in the variables map to parameterize the stage. The at least one processor determines to execute the stage of the program based on an execution configuration and the parameterized stage populated from the variables map.

In some embodiments, the present disclosure provides an exemplary technically improved computer-based produce that includes at least the following components of a non-transitory computer readable medium storing software thereon, the software including instructions configured to cause at least one processor of at least one computer to perform steps including instantiating at least one program based on at least one program configuration, where the at least one program configuration includes: at least one customizable scheduling configuration, and at least one execution step of a current execution stage of the at least one program. The steps further include receiving a current execution state of the at least one program from a state persistence storage. Determining a stage configuration of the current execution stage of the at least one program; where the stage configuration includes: a dependency configuration, an execution configuration, a validation configuration, and a rollback configuration; where the dependency configuration includes a sequence of alphanumerical groups for locating dependencies according to pattern matching between the sequence of alphanumerical groups and a plurality of parameterized file paths associated with at least one data unit of the state persistence storage; where the plurality of parameterized file paths saved in a form of a variables map; where the dependencies include resources for execution of the current execution stage; where the execution configuration defines steps for executing the current execution stage; where the validation configuration defines steps for validating execution of the current execution stage; where the rollback configuration defines steps for recovering from a failed execution of the current execution stage. The steps further include determining a program execution readiness to identify when to execute the current execution stage of the at least one program associated with the current execution state based on the execution configuration and a plurality of program-specific parameterized values populated from the variables map; instantiating the current execution stage of the at least one program based on the program execution readiness; determining an execution status of the at least one execution stage based on the validation configuration; determining to rollback to a previous execution stage before the current execution stage based on the execution status and the rollback configuration; and updating the current execution state of the at least one program in the at least one data unit of the persistent storage based on the execution of the at least one state step to form a subsequent execution state of the at least one program.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
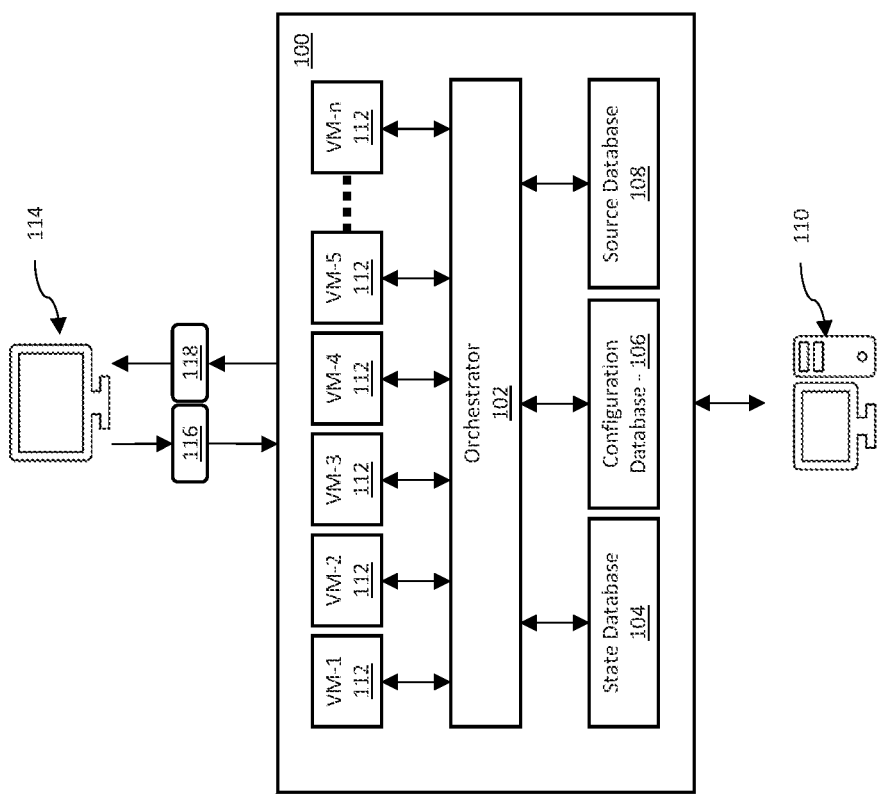
FIGS. 1-7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; in some embodiments, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tapped" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99, 999,999), at least 100,000,000 (e.g., but not limited to, 100,000,000-999,999,999), at least 1,000,000,000 (e.g., but not limited to, 1,000,000,000-9,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 7 illustrate systems and methods of persistent state management and configurable execution flow. The following embodiments provide technical solutions and/or technical improvements that overcome technical problems, drawbacks and/or deficiencies in the technical fields involving cloud platform, virtual machine and remote task management and recovery. As explained in more detail, below, technical solutions and/or technical improvements herein include aspects of improved task and state configuration, process scheduling and management, state logging and process recovery in and across networked computing devices and virtual machines. Based on such technical features, further technical benefits become available to users and operators of these systems and methods. In some embodiments, various practical applications of the disclosed technology are also described, which provide further practical benefits to users and operators that are also new and useful improvements in the art.

FIG. 1 illustrates a block diagram of an exemplary inventive computer-based system for activities-defined software object orchestration with persistent state management and configurable execution flow in accordance with one or more embodiments of the present disclosure.

In embodiments of the present invention, an activities-defined software object execution management platform 100 interacts with user computing devices 114 according to administered settings defined by an administrator at an administrative computing device 110. As used herein, an activities-defined software object refers to one or more processing tasks that act as components of processing an orchestrated and repeatable pattern of activity, enabled by the systematic organization of resources into processes that provide services and/or process information. It can be depicted as a sequence of operations, the work of a processor or group of processors, or one or more simple or complex mechanisms. In some embodiments, the activities-defined software object execution management platform 100 facilitates orchestration and management of the activities, tasks, resources, processes, services and/or information.

In embodiments, a user may send a request 116 to the activities-defined software object execution management platform 100 to initiate a program or perform a task via, e.g., an application programming interface (API) or other interface and communication method. In the same or other embodiments, the program or task may be a function of the activities-defined software object execution management platform 100 itself, such as security tasks, platform level functions, or other programs. The activities-defined software object execution management platform 100 may also return results of the user request program to the user computing device 114 via, e.g., an API or other interface method. In some embodiments, the user computing device 114, the activities-defined software object execution management platform 100 and the administrative computing device 110 may each communicate electrically across an electronic communication medium such as, e.g., a wired communication connection such as ethernet, fiber optic, or other wired connection, a wireless communication connection, such as WiFi, Bluetooth™, Zigbee™, 4G, 5G, Global System for Mobiles (GSM), Carrier Division Multiple Access (CDMA), or other wireless connection. In some embodiments, the communication may be made via a suitable communication protocol, such as, e.g., the internet protocol (IP), Hypertext Transfer Protocol (HTTP), BitTorrent, Secure Shell protocol (SSH), among other suitable protocols.

In some embodiments, the activities-defined software object execution management platform 100 may receive many such requests for program instantiation. To facilitate orchestration of the various activities-defined software objects associated with each program being instantiated, an orchestrator 102 may coordinate virtual machines (VMs) 112 to perform each task in each of the activities-defined software objects.

As used herein, the terms "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment.

In some embodiments, each activities-defined software object may include source files separate from each respective configuration file for configuring each respective activities-defined software object. Thus, in some embodiments, the orchestrator 102 may access a configuration file for a given activities-defined software object at a configuration database 106. The configuration database 106 stores and/or caches configuration files for each activities-defined software object. In some embodiments, the orchestrator 102 itself may be configured to access pre-determined configuration files within the configuration database 102 at pre-determined times. For example, the administrator associated with the administration computing device 110 may define a list of configuration files in a configuration for the orchestrator 102. The configuration of the orchestrator 102 may then cause the orchestrator 102 to retrieve via electronic communication the listed configuration files at pre-determined times defined within the configuration of the orchestrator 102 as set forth by the administrator. In some embodiments, in some embodiments, the orchestrator 102 may be configured to scan all configuration files in the configuration databased 106 regularly, e.g., daily, weekly, monthly, hourly, etc., or constantly.

In some embodiments, the configuration files themselves define configurations. In some embodiments, the configurations may be associated with particular activities-defined software objects. Thus, each configuration file may define aspects and parameters of orchestrating activities-defined software objects. For example, the configuration files may include customizable parameters for, but not limited to, e.g., initial date and/or time for execution, final data and/or time for execution, backfill duration, monitoring duration, cadence (e.g., scheduling of activities-defined software object execution), custom times with labels and associated base variables with time offsets, and a set of stages to execute for the corresponding activities-defined software object. The configuration files may be fully customizable by, e.g., the administrator at the administration computing device 120.

In some embodiments, the configuration files are stored separately in the configuration database 106 from source files for each activities-defined software object, which may be stored in a source database 108. Thus, configuration of activities-defined software objects and source files of those same activities-defined software objects may be maintained separately and independently. Thus, an administrator may configure an activities-defined software object without having to configure or otherwise manipulate the source files themselves.

In some embodiments, to execute the activities-defined software object, the orchestrator 102 may then access the source files, including any dependencies listed within the configuration file for a given activities-defined software object. In some embodiments, the source files and the dependencies may be stored within the source database 108. Thus, the orchestrator 102 may retrieve the source files and dependencies from the source database 108 by, e.g., electronic communication such as those described above (e.g., API call(s)). In some embodiments, the activities-defined software object may have different dependencies and source files based on the execution state of the activities-defined software object. Thus, for each stage in the activities-defined software object, the orchestrator 102 may need to retrieve different source files and dependencies.

In some embodiments, the activities-defined software object may not always complete a full execution during an execution duration, e.g., a start time and final time, defined within a respective configuration file. Thus, the state of the activities-defined software object upon initialization, for example, in the event of an interruption by the final, an outage, or other interruption, may require specific dependencies. Even where the activities-defined software object is not interrupted, the orchestrator 102 may retrieve the dependencies and source files concurrently with initializing a stage in the activities-defined software object, e.g., with each task of a program, rather that retrieving the files all at once upon initializing the activities-defined software object. Thus, in some embodiments, the current execution state of the activities-defined software object, e.g., the last completed stage, can affect the dependencies and source files retrieved by the orchestrator 102. In some embodiments, execution state is recorded in persistent storage in, e.g., a state database 104 as a file, such as, e.g., a data table summarizing execution states for each program and each activities-defined software object.

Accordingly, the orchestrator 102 may access, e.g., an execution summary in the state database 104. Based on a most recent state of the activities-defined software object as recorded in an associated execution summary table, the orchestrator 102 may initialize a next stage of the activities-defined software object. As described above, regardless of when that most current execution state of the activities-defined software object was recorded, the orchestrator 102 may easily and efficiently determine a next stage to schedule. Thus, a combination of the configuration file in the configuration database 106 and execution states recorded in a persistent state database 104 may facilitate accurate and efficient task scheduling pertaining to activities-defined software objects and programs by the orchestrator 102.

In some embodiments, in some embodiments, prior to initializing a next stage of an activities-defined software object or program, the orchestrator 102 may perform checks to ensure proper functioning of the activities-defined software object or program. For example, the orchestrator 102 may check an availability of dependencies, including, e.g., dependent files and dependent resources of a stage of the activities-defined software object and/or program. The dependencies may be defined within the configuration file associated with the activities-defined software object and/or program. In fact, each stage of the activities-defined software object and/or program may have a set of dependent files referenced in the configuration file. The dependent files may be automatically generated or manually input into the configuration file.

Based on the configuration file and the dependencies set forth therein, the orchestrator may, in some embodiments, perform a check for the existence of the appropriate dependencies for a stage to be scheduled. Where the dependencies exist, the orchestrator 102 may schedule and instantiate the stage on one or more of the VMs 112 for execution, including retrieving the dependencies and the source files associated with the stage form the source database 108. In some embodiments, the execution of the stage may include initializing, e.g., a MapReduce framework for scheduling tasks of the stage, such as, e.g., an Elastic MapReduce (EMR) framework to elastically schedule the VMs 112 to perform the tasks associated with the stage.

In some embodiments, during execution, the orchestrator 102 may update an associated execution state table with a current execution status at each stage of the program and/or activities-defined software object being executed. The execution status may include but is not limited to, e.g., launch time of a program, stages run, including a name of the stage, a start time of the stage, a result of the execution of the stage, a status of the stage (e.g., completed, failed, in progress, etc.), as well as a variables map that maps and records values for variables used within each stage. In some embodiments, the execution status includes the state table as described above, and is recorded in the state database 104 to facilitate seamless and efficient program completion and continuation, including upon interruptions and failures in executions of programs and/or activities-defined software objects.

In some embodiments, the configuration file for a given program and/or activities-defined software object provides identifying information for location the appropriate execution state table in the state database 104. In some embodiments, because the programs and/or activities-defined software objects, including the stages included therein, can vary in naming, as well as create and modify files and variables, a configuration file that simply lists a file name, for example, may not retrieve all necessary files for executing a stage. Thus, the configuration file may utilize a parameterized version of file names. The parameterized version can specify, e.g., file paths with parameterized file names within the files paths. In some embodiments, other techniques for parameterizing file locations are also contemplated. To facilitate tracking parameterizations so that the orchestrator 102 may quickly and accurately locate dependencies and other data, the execution status information, e.g., listed in an execution status table as described above, may include a variables map. The variables map includes name-value pairs created within a stage to map values generated in the stage to names in the stage such that various stage components, such as, e.g., dependencies, results, etc., may be parameterized. In some embodiments, the variables map of an execution status is used to update a variables map of the configuration file. Thus, the configuration file maintains an updated list of name/value pairs so that components of the program and/or activities-defined software object may be parameterized for efficient and accurate locating of, e.g., dependencies, stages, results, among other components. Thus, the configuration file and the execution status tables may facilitate accurate and efficient stage scheduling that is also fully customizable using parameterized file look-ups.

In some embodiments, there are times when a dependent file may not be located because, e.g., the file has been deleted, corrupted, or not yet created by another task. Where the orchestrator 102 fails to find a dependency, the orchestrator 102 may delay execution of the associated stage according to, e.g., a validation configuration. In some embodiments, the delay may be customizable via the configuration file for the activities-defined software object and/or program. For example, the configuration file may define a, e.g., five-minute delay before retrying execution of the stage. In some embodiments, other delays are contemplated, such as, e.g., one minute, ten minutes, fifteen minutes, thirty minutes, an hour, a day, a week, among other appropriate delays. Because the delay may be defined within a configuration file, each activities-defined software object and/or program, and indeed each stage within an activities-defined software object and/or program, may have a delay upon failure of validation to that is appropriate for the given activities-defined software object, program and/or stage.

Accordingly, in some embodiments, the orchestrator 102 may schedule tasks for execution, e.g., on VMs 112 according to a customizable configuration file stored in the configuration database 106 for each program, activities-defined software object, and/or stage. In some embodiments, the configuration file may include configuration specifications that facilitate location of source files in the source database 108, and execution status records and/or tables in the state database 104, including dependencies. Thus, the orchestrator 102 of the exemplary inventive computer-based system for activities-defined software object execution management platform 100 may easily and efficiently manage the execution of activities-defined software objects and/or programs using efficient location of all necessary source files and dependencies according to fully configurable parameters.

Figure 2:
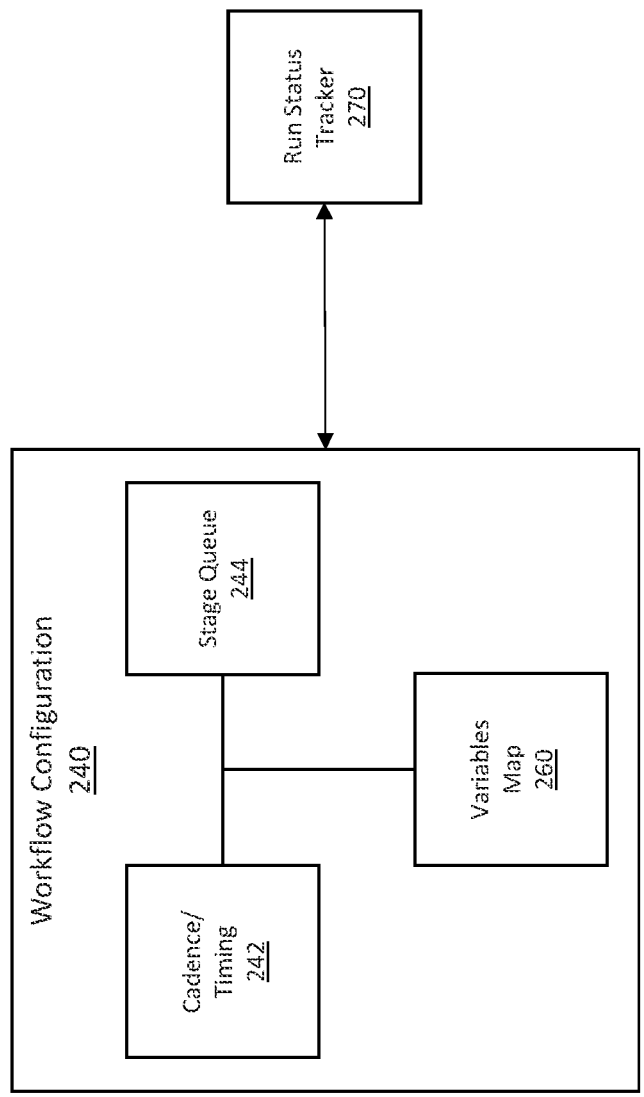

FIG. 2 is a block diagram of another exemplary computer-based system for activities-defined software object orchestration with persistent state management and configurable execution flow with activities-defined software object configuration in accordance with one or more embodiments of the present disclosure.

In some embodiments of the present invention, an activities-defined software object orchestrator, such as, e.g., the orchestrator 102 described above, of an exemplary inventive activities-defined software object execution management platform may orchestrate programs according to an activities-defined software object configuration 240. In some embodiments, the activities-defined software object configuration 240 represents a module formed of, e.g., a combination of software and hardware, for specifying parameters of execution of a program. In some embodiments, the activities-defined software object configuration 240 includes cadence and timing configurations 242, stage queue configurations 244 and a variables map 260.

In some embodiments, the cadence and timing configuration 242 provides customizable specifications for when tasks of a program may be executed. Thus, the cadence and timing configuration 242 may provide specifications for start and end times, backfill, monitoring durations, execution cadences, among other timing parameters.

In some embodiments, the cadence and timing configuration 242 controls cadence configurations associated with, e.g., a program. The cadence configurations may include scheduling by, e.g., a two-dimensional matrix using cron syntax. For example, using cron syntax, a task may be controlled to run at intersections of execution times specified in each column, in a given row, and in a union of all rows. The cadence may include periods within which tasks associated with given program may be executed. Using the matrix structure facilitates efficient and flexible cadence control of tasks, by establishing in-depth conditions for execution periods. For example, the matrix may include two rows, a first row and a second row. The first row may include two columns: a first column for the first, second and third days of the month, and a second column for Monday and Tuesday. The second row may include three columns: a first column for every day of the month, a second column for February, and a third column for Thursday. Thus, according to the example cadence configuration, tasks will execute on Monday and Tuesday if the Monday and Tuesday are within the first three days of a month, and on every Thursday in February. Accordingly, efficient and customizable cadence control can be defined by the cadence configuration of the cadence and timing configuration 242.

In some embodiments, the cadence and timing configuration 242 may also include initial time configurations and final time configurations to control the first and last, respectively, time for execution of tasks. The initial and final time configurations may include limits on days and times for performing executions. For example, the start may be configured as Mondays at nine in the evening, with a final time of Tuesdays at five in the morning. Thus, the tasks are controlled to executed within a window of between 9:00 P.M. on Mondays and 5:00 AM on Tuesdays. Thus, each program and/or activities-defined software object may be controlled for execution within certain time frames. In some embodiments, the initial and final times may be used to schedule programs and/or activities-defined software objects for a single specified date. Thus, full, customizable control of when tasks of programs and/or activities-defined software objects may run can be configured and implemented by the cadence and timing configuration 242.

In some embodiments, the cadence and timing configuration 242 may include backfill configurations to control an amount of time before backfilling a failed task. For example, in situations where a task fails due to, e.g., missing dependencies, execution of the task may be attempted again for a given period of time. In some embodiments, after that given period of time elapses, the task may be deemed non-executable, and rather a backfill process may be initiated.

In some embodiments, the cadence and timing configuration 242 may include a monitoring configuration. In some embodiments, the monitoring configuration controls the scheduling of tasks by specifying the execution of instantiation and validation stages before executing a subsequent task. For example, the monitoring configuration may define a schedule for validation durations and execution durations for a task such that tasks may be controlled to operate within a given time limit to prevent resource overuse due to, e.g., errors in execution or validation, among other causes for resource overuse.

In some embodiments, the cadence and timing configuration 242 may include a custom timing configuration based off of a current time. In some embodiments the custom timing configuration may specify custom timing for particular executions based on an offset defined by a user relative to a current time (e.g., a "now" time) and a run time (e.g., "run"). For example, a task can be configured to utilize and/or record a log of data from, e.g., −8 hours offset from now (e.g., 8 hours into the past) until the task is executed +5 hours offset from now (e.g., 5 hours in the future). Thus, a specified task can be controlled with a custom duration based on a name of the task and the specified offset.

In some embodiments, the activities-defined software object configuration 240 of the exemplary inventive activities-defined software object execution management platform may include a stage queue configuration 244. While the cadence/timing configuration 242 provides global controls for tasks of a given activities-defined software object and/or program, the activities-defined software object and/or program may include one or more stages. In some embodiments, the stage queue configuration 244 may provide control of stage orders, as well as local configurations for each stage within the queue. For example, where a program has five stages, the stage queue configuration 244 may set forth each of the five stages in order. Additionally, each of the five stages may be configured with specific configuration details that may modify or be in addition to the cadence and timing configurations 242. Accordingly, the stage queue configuration 244 may provide more granular control of the stages of a program and/or activities-defined software object, including, e.g., dependency configurations, execution configurations, validation configurations, rollback configurations, among other configurations to control the execution of stages of an activities-defined software object and/or program.

In some embodiments, the activities-defined software object configuration 240 of the exemplary inventive activities-defined software object execution management platform may include the variables map 260. Each of the cadence and timing configurations 242 and the stage queue configurations 244 may generate or modify name/value pairs associated with a program. The name/value pairs can be associated with file names, data results, generated and or modified data, such as, e.g., tables, arrays, matrices, strings, numbers, among others. The variables map 260 may record the generation and modification to each name/value pair for a global list of the name/value pairs such that each stage and each task, and the respective configurations may map configuration controls to specific names and values. Thus, the variables map 260 may harmonize and synchronize the controls of each of the cadence and timing configurations 242 and the stage queue configurations 244.

Thus, embodiments of the exemplary inventive activities-defined software object execution management platform include configuration modules for efficiently and customizably controlling the execution of programs and/or activities-defined software objects. Table 1 below represents an example of such an activities-defined software object configuration 240 in pseudo-code according to principles of the present exemplary inventive activities-defined software object execution management platform:

TABLE 1

```
{
   "cadence":[["0,30 * * * *"]],
   "initial":"2019-01-01 13:00",
   "final":"2019-06-24 20:00",
   "backfill":"-120 minutes",
   "monitor":"-6 hours",
   "custom_times":{ "what":["now","7 hours"], "bleh":["run","-3 days"] },
   "maintain_sequence":true,
   "stages":{
     {
       "name":"Do The First Thing",
     },
     {
       "name":"Do The Second Thing",
     }
   {
}
```

In some embodiments, throughout execution of a program and/or activities-defined software object, according to the status of the program and/or activities-defined software object can be recorded in a run status tracker 270. In some embodiments, upon instantiation of a program and/or activities-defined software object, the activities-defined software object configuration 240 can cause the program and/or activities-defined software object to report a program run, including a name and scheduled execution time according to the cadence and timing configuration 242. Alternatively, an orchestrator, such as the orchestrator 102, may automatically pull the program run information from the activities-defined software object configuration upon scheduling of a program and/or activities-defined software object. Similarly, upon instantiation of the program, the exact time of launch of the program can be record in the run status tracker 270. In some embodiments, stages in the stage queue configurations 244 may also be reported and recorded. In some embodiments, the run status tracker 270 may include logs associated with variables according to the variables map 260. Thus, the run status tracker 270 may keep an up-to-date log of the state of a stage of a program and/or activities-defined software object. The run status tracker 270 may then be stored in a persistent state storage, such as, e.g., the state database 104 described above, in e.g., table format.

Figure 3:
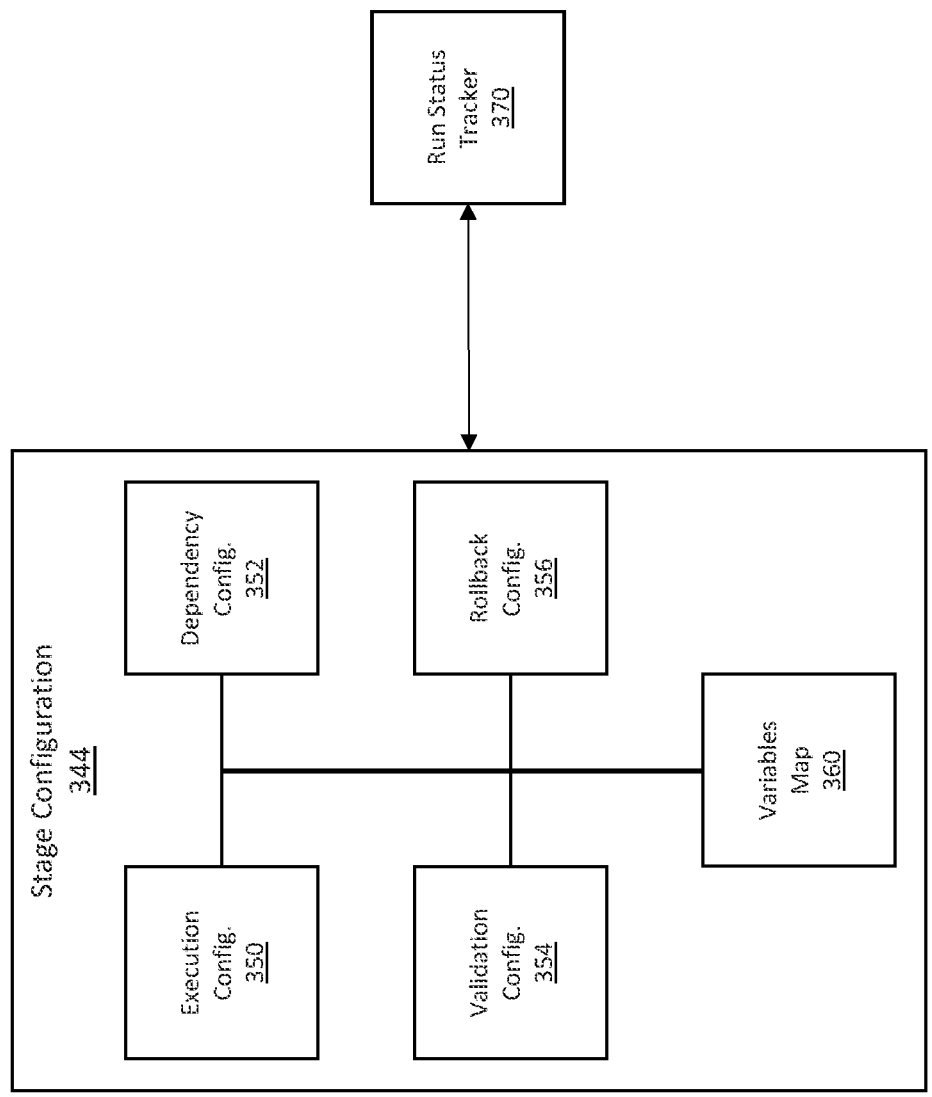

FIG. 3 is a block diagram of another exemplary computer-based system for activities-defined software object orchestration with persistent state management and configurable execution flow with activities-defined software object configuration in accordance with one or more embodiments of the present disclosure.

In some embodiments of the exemplary inventive activities-defined software object execution management platform, a stage configuration 344, such as a configuration of the stage queue configuration 244 in the activities-defined software object configuration 240 described above, represents a module formed of, e.g., a combination of software and hardware, for specifying parameters of execution of a given stage of a program and/or activities-defined software object. In some embodiments, the stage configuration 344 may include an execution configuration 350, a dependency configurations 352, a validation configuration 354, a rollback configuration 356 and a variables map 360, such as, e.g., the variables map 260 described above, among other suitable configurations. Thus, in some embodiments, the stage configuration 344 provides controls for stages of an activities-defined software object and/or program for efficient and customizable scheduling by, e.g., the orchestrator 102 described above. A given activities-defined software object configuration may include one or more stage configurations 344 in the stage queue configurations for controlling each stage in a granular and customizable fashion.

In some embodiments, the execution configuration 350 specifies tasks for perform for execution of a stage, including one or more commands associated with the stage. For example, the execution configuration 350 may include commands to, e.g., create files associated with the stage, launch EMR to schedule the stage, as well as any other commands to, e.g., an orchestrator such as the orchestrator 102 described above for implementing and executing the stage of a program and/or activities-defined software object. In some embodiments, some or all of the commands may include parameterized values that can call functions and files without hard coding the function and file names in the execution configuration. For example, the execution configuration 350 may utilize the variables map to parameterize function commands, controlling the instantiation of a command by calling a variable that is mapped to a function in the variables map 360. Thus, by communication between the execution configuration 350 and the variables map 360, execution controls can be parameterized and changed in the variables map 360 without having to modify the execution configuration 350.

Similarly, in some embodiments, the dependency configurations 352 may communication with the variables map to parameterize dependency names, among other configuration settings. In some embodiments, the dependency configurations 352 may control file dependencies for the stage associated with the stage configuration 344. In some embodiments, dependencies may change or become relocated in, e.g., a storage bucket or other storage system, such as, e.g., Amazon™ S3™ storage, among other storage solutions. To facilitate locating dependencies in a flexible and accurate manner, the dependency configurations 352 may leverage a pattern matching protocol for identifying a file path and a file name associated with each dependency listed for the stage. Thus, in some embodiments, the dependency configurations 352 may define search criteria for locating and accessing dependencies. The search criteria may, for example, utilize a sequence of prefixes to allow the system to find the file. Each prefix element in the sequence may utilize an exact match or a regular expression match to identify the associated element in, e.g., a file path. As a result, the file paths and file names of each dependency can be parameterizable using, e.g., the variables map 360. In situations where there are multiple matches, the dependency configuration 352 may implement controls for selecting lowest or highest scoring matches according to the pattern matching protocol. In some embodiments, parameterizations and matches to the prefixes may be saved in the variables map 360 to update the variables map 360 with new dependency data. Thus, using the dependency configurations 352 and the variables map 360, dependent files may be efficiently and accurately located to facilitate a lower likelihood of error and delay.

In some embodiments, the validation configuration 354 controls conditions checks to validate correct execution of stage. For example, the validation configuration 354 may include condition checks for conditions such as the existence of a file, infrastructure status, resource availability, and other conditions for executing a task. In some embodiments, similar to the dependency configurations 352, the validation configuration 354 may specify files indicative for successful execution, defined according to pattern matching a file path and a name according to a sequence of prefixes and variables in the variables map 360. Where a condition check fails, the validation configuration 354 may specify a maximum amount of time that may elapse before an execution is deemed a failure. For example, a stage may be configured to have, e.g., about 5 minutes to satisfy all condition checks, or about 8 minutes, or any other suitable duration to prevent resource misuse and inefficient scheduling. In that time, the stage may be retested and re-executed continually in an attempt to successfully meet all conditions until the maximum time elapses.

In some embodiments, the rollback configuration 356 controls the stage in the event an execution fails. For example, where the condition checks established by the validation configuration 354 are not met within the maximum time period, the rollback configuration 356 may determine a next step. In some embodiments, the rollback configuration 356 may include a command for the rollback along with any parameterizable values, similar to, e.g., the execution configuration 350 described above.

Thus, embodiments of the exemplary inventive activities-defined software object execution management platform include configuration modules for efficiently and customizably controlling the execution of stages of programs and/or activities-defined software objects. Table 2 below represents an example of such a stage configuration 344 in pseudo-code according to principles of the present exemplary inventive activities-defined software object execution management platform:

TABLE 2

```
"stages":{
  {
  "name":"Do The First Thing",
  "dependencies":{
    "first_file":{
      "bucket":"cof-card-dev-ms-line-mgt-us-east-1",
      "prefix":[{"match":"tx"},{"match":"TEST_FOUR"},{"match":"yahoo_clou
        d_services/z"},{"match":"^test_0399\\d.*$","type":"regex","multiple":
        "min"}]
    },
    "second_file":{
      "bucket":"cof-card-dev-ms-line-mgt-us-east-1",
      "prefix":[{"match":"tx/TEST_FOUR/^yahoo_cloud_services$/^z$/^test_
        0399\\d.*$","type":"regex","multiple":"max"}]
    },
    "third_file":{
      "bucket":"cof-card-dev-ms-line-mgt-us-east-1",
      "prefix":[{"match":"tx/TEST_FOUR/yahoo_cloud_services/x/dir_\\d\\d
        \\d\\d/file.txt","type":"regex","multiple":"max"}]
    },
    "fourth_file":{
      "bucket":"cof-card-dev-ms-line-mgt-us-east-1",
      "prefix":[{"match":"tx/TEST_FOUR/yahoo_cloud_services/z/^test_01\\
        d\\d\\d.*$","type":"regex","multiple":"max"}]
    },
    "fifth_file":{
      "bucket":"cof-card-dev-ms-line-mgt-us-east-1",
      "prefix":[{"match":"tx/TEST_FOUR/yahoo.*services/z","type":"regex"},
        {"match":"^test_01\\d\\d\\d.*$","type":"regex","multiple":"min"}]
    }
  },
  "execute": {
    "command":"publish_file_to_s3",
    "params":["cof-card-dev-ms-line-mgt-us-east-
      1/tz/{program_name}/{run_name}/datasources.csv","File_Name,File_Location
      \nfirst_file,{first_file}\nsecond_file,{second_file}"]
  },
  }
  "validate":{
    {
    "condition":"file_exists",
    "params":{
```

TABLE 2-continued

```
    "bucket":"cof-card-dev-ms-line-mgt-us-east-1",
    "prefix":[{"match":"tx"},{"match":"TEST_FOUR"},{"match":"yahoo_clou
    d_services/z"},{"match":"test_0399\\d.*$","type":"regex","multiple":
       "min"}]
   },
   "maximum_time": "5 seconds"
   }
  }
},
```

In some embodiments, upon completion of a stage according to the stage configuration 344, the status of the stage can be recorded in a run status tracker 370, such as, e.g., in the run status tracker 270 described above. Upon completion of a task run in the stage, the stage configuration 344 may report characteristics of the stage execution to the run status tracker 370. In some embodiments, the run status tracker 370 may include logs associated with a name of the stage, a status of the stage, a time at which the stage was instantiated, and variables according to the variables map 360. In some embodiments, the execution configuration 350 may control the stage to report the name of the stage and the time of instantiation to the run status tracker 370. Additionally, in some embodiments, the execution configuration 350 may also cause the stage to report a "started" status to the run status tracker 370. Upon analysis at the validation configuration 354, the status of the stage may then be reported. For example, where the stage fails the condition checks based on the validation configuration 354, the status may be changed from "started" to "failed" based on a rollback command in the rollback configuration 356 in response to the value of the validation configuration 354. In some embodiments, where the stage passes the validation configuration 354 checks, the status can be changed in the run status tracker 370 to "completed." Thus, the run status tracker 370 may keep an up-to-date log of the state of a stage of a program and/or activities-defined software object. The run status tracker 370 may then be stored in a persistent state storage, such as, e.g., the state database 104 described above, in e.g., table format.

Figure 4:
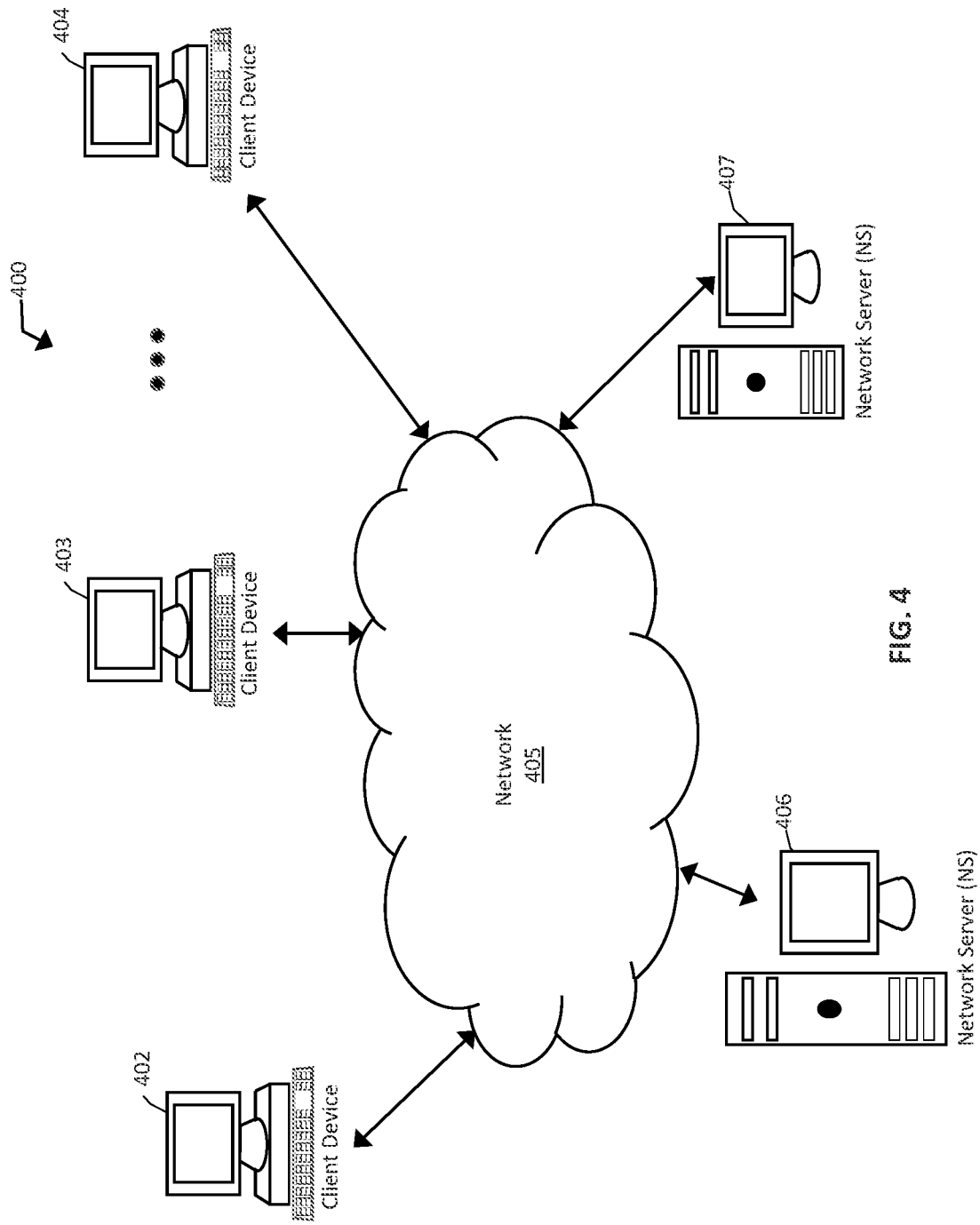

FIG. 4 depicts a block diagram of an exemplary computer-based system/platform 400 in accordance with one or more embodiments of the present disclosure. In some embodiments, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one or more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
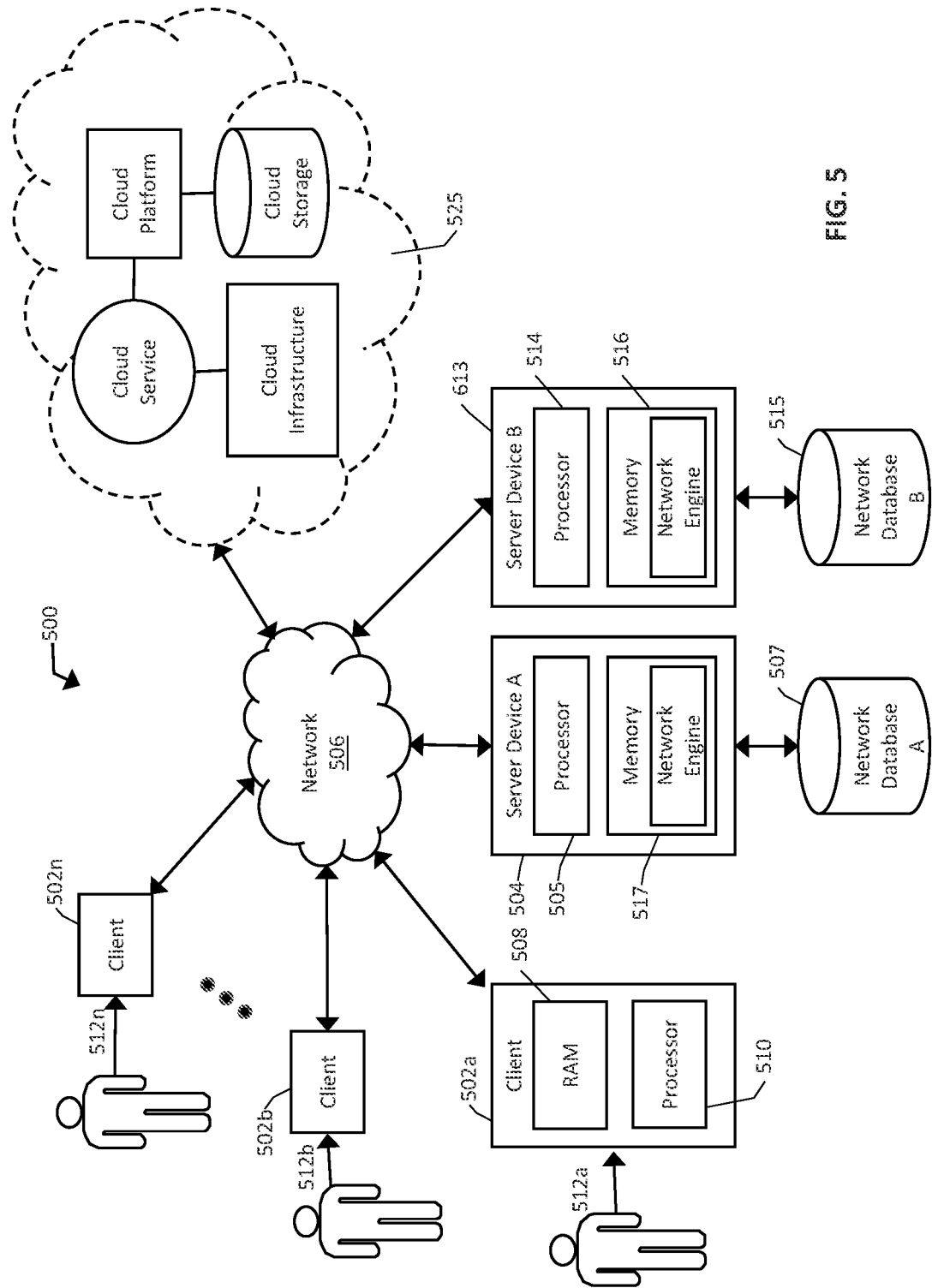

FIG. 5 depicts a block diagram of another exemplary computer-based system/platform 500 in accordance with one or more embodiments of the present disclosure. In some embodiments, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
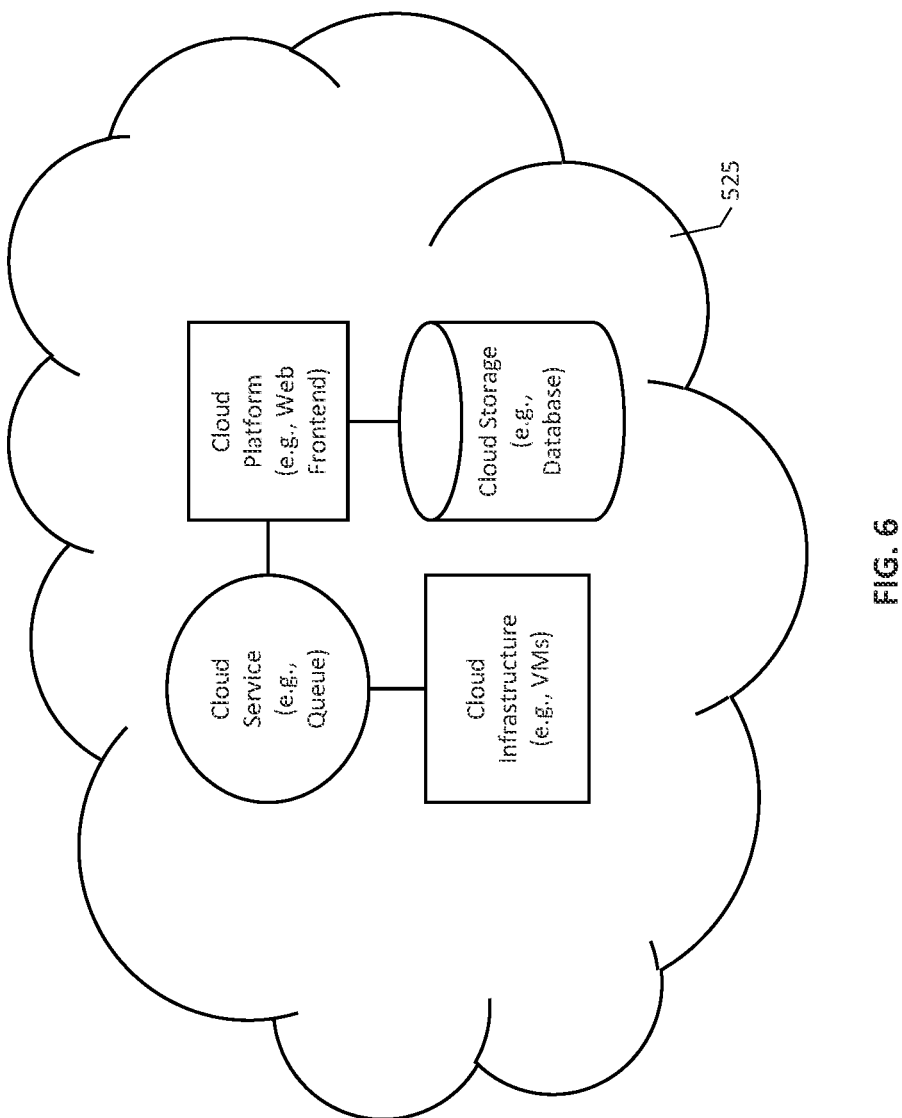
Figure 7:
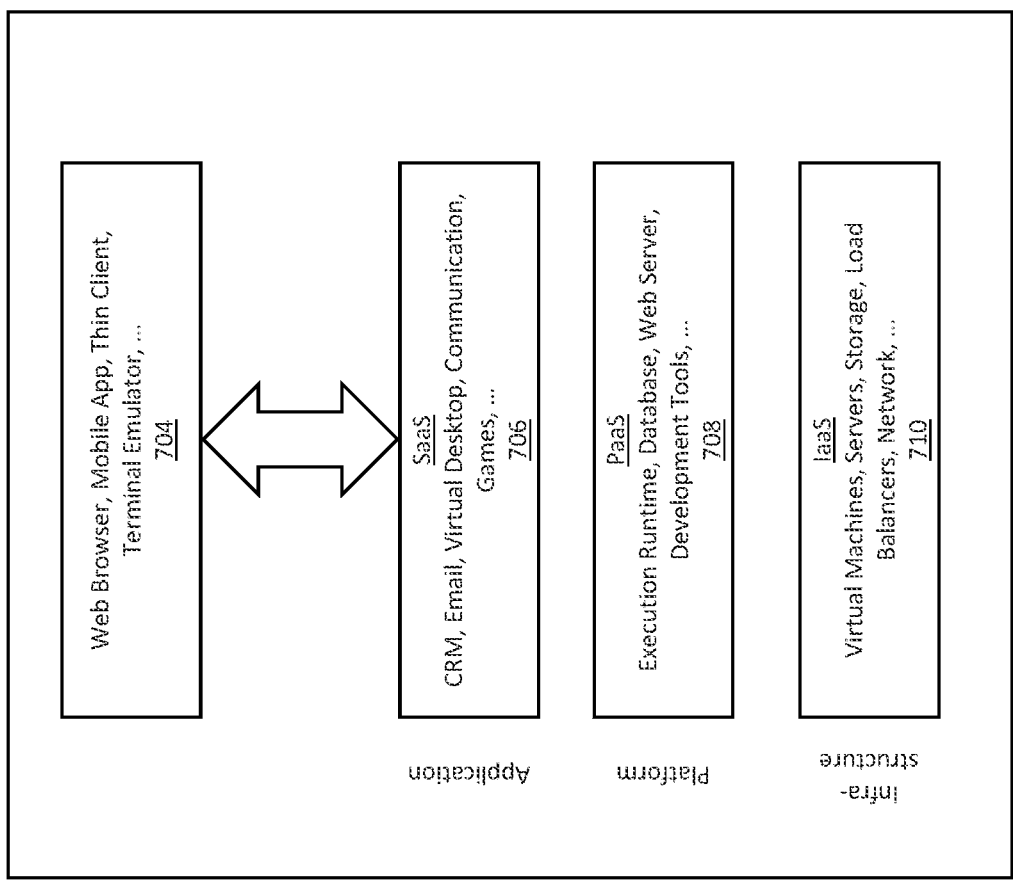

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method, comprising:
   instantiating, by at least one processor, at least one program based on at least one program configuration;
      wherein the at least one program configuration comprises:
         i) at least one customizable scheduling configuration, and
         ii) at least one execution step of a current execution stage of the at least one program;
   receiving, by the at least one processor, a current execution state of the at least one program from a state persistence storage;
   determining, by the at least one processor, a stage configuration of the current execution stage of the at least one program;
      wherein the stage configuration comprises:
         i) a dependency configuration,
         ii) an execution configuration,
         iii) a validation configuration, and
         iv) a rollback configuration;
            wherein the dependency configuration comprises a sequence of alphanumerical groups for locating dependencies according to pattern matching between the sequence of alphanumerical groups and a plurality of parameterized file paths associated with at least one data unit of the state persistence storage;
            wherein the plurality of parameterized file paths saved in a form of a variables map;
            wherein the dependencies comprise resources for execution of the current execution stage;
            wherein the execution configuration defines steps for executing the current execution stage;
            wherein the validation configuration defines steps for validating execution of the current execution stage;
            wherein the rollback configuration defines steps for recovering from a failed execution of the current execution stage;
   determining, by the at least one processor, a program execution readiness to identify when to execute the current execution stage of the at least one program associated with the current execution state based on the execution configuration and a plurality of program-specific parameterized values populated from the variables map;
   instantiating, by the at least one processor, the current execution stage of the at least one program based on the program execution readiness;
   determining, by the at least one processor, an execution status of the at least one execution stage based on the validation configuration;
   determining, by the at least one processor, to rollback to a previous execution stage before the current execution stage based on the execution status and the rollback configuration; and
   updating, by the at least one processor, the current execution state of the at least one program in the at least one data unit of the persistent storage based on the execution of the at least one state step to form a subsequent execution state of the at least one program.

2. The method of clause 1, further comprising:
   searching, by the at least one processor, the at least one data unit by pattern matching dependency files with the sequence of prefixes;
      wherein the sequence of prefixes comprises at least one prefix element according to a customizable configuration;
   generating, by the at least one processor, the variables map based on the sequence of prefixes;
   comparing, by the at least one processor, file paths and file names of the dependency files in the at least one data unit with the variables map;
   identifying, by the at least one processor, the dependencies based on matched files paths and matched file names; and
   storing, by the at least one processor, the dependency in the variables map to parameterize the stage.

3. The method of clause 2, further comprising selecting, by the at least one processor, one of the matched file paths and matched file names for the sequence of prefixes.

4. The method of clause 1, wherein the execution configuration comprises:
   i) at least one command, and
   ii) the parameterized values populated from the variables map.

5. The method of clause 1, wherein the validation configuration comprises:
i) one or more condition checks, and
ii) a maximum time for determining satisfaction of the one or more condition checks.
6. The method clause 1, wherein the rollback configuration comprises:
i) at least one rollback command, and
ii) the parameterized values populated from the variables map.
7. The method of clause 1, recording, by the at least one processor, for each stage of the at least one program, a run status tracking record, comprising:
i) a name and scheduled execution time of the at least one program,
ii) a launch time of the at least one program associated with an actual time of a launch of the at least one program;
iii) a name of each stage of the at least one program,
iv) a status of each stage of the at least one program,
v) a time of instantiation of each stage of the at least one program, and
vi) the variables map associated with each stage of the at least one program.
8. The method of clause 1, further comprising reattempting, by the at least one processor, to execute the at least one stage of the at least one program associated with the state upon an elapsed validation time based on the validation configuration.
9. The method of clause 1, further comprising instantiating, by the at least one processor, a second at least one stage of the at least one program concurrently with the at least one stage.
10. A method, comprising:
searching, by at least one processor, a data unit of state persistence storage by pattern matching dependency files with one or more sequences of prefixes associated with a stage of a program;
wherein the one or more sequences of prefixes comprises at least one prefix element according to a customizable configuration;
generating, by the at least one processor, a variables map based on the sequence of prefixes;
comparing, by the at least one processor, file paths and file names of dependency files in the state persistence storage with the variables map;
identifying, by the at least one processor, the dependency of the stage of the program in the state persistence storage based on matched files paths and matched file names;
storing, by the at least one processor, the dependency in the variables map to parameterize the stage; and
determining, by the at least one processor, to execute the stage of the program based on an execution configuration and the parameterized stage populated from the variables map.
11. The method of clause 10, further comprising selecting, by the at least one processor, one of the matched file paths and matched file names for the sequence of prefixes.
12. The method of clause 10, further comprising instantiating, by the at least one processor, the program based on at least one program configuration;
wherein the at least one program configuration comprises:
i) at least one customizable scheduling configuration, and
ii) at least one state step for execution of a stage of the at least one program.
13. The method of clause 10, further comprising receiving, by the at least one processor, the state of the program from the state persistence storage;
14. The method of clause 10, determining, by the at least one processor, the current execution stage of the program based on the state and a stage configuration;
wherein the stage configuration comprises:
i) a dependency configuration,
ii) an execution configuration,
iii) a validation configuration, and
iv) a rollback configuration;
wherein the dependency configuration comprises the sequence of prefixes for locating dependencies according to the pattern matching between the sequence of prefixes and parameterized file paths associated with the data unit of the state persistence storage.
15. The method of clause 14, wherein the execution configuration comprises:
i) at least one command, and
ii) the parameterized values populated from the variables map.
16. The method of clause 14, wherein the validation configuration comprises:
i) one or more condition checks, and
ii) a maximum time for determining satisfaction of the one or more condition checks.
17. The method clause 14, wherein the rollback configuration comprises:
i) at least one rollback command, and
ii) the parameterized values populated from the variables map.
18. The method of clause 10, recording, by the at least one processor, for each stage of the program, a run status tracking record, comprising:
i) a name and scheduled execution time of the at least one program,
ii) a launch time of the at least one program associated with an actual time of a launch of the at least one program;
iii) a name of each stage of the at least one program,
iv) a status of each stage of the at least one program,
v) a time of instantiation of each stage of the at least one program, and
vi) the variables map associated with each stage of the at least one program.
19. The method of clause 10, further comprising reattempting, by the at least one processor, to execute the stage of the program associated with the state upon an elapsed validation time based on a validation configuration.
20. A non-transitory computer readable medium storing software thereon, the software comprising instructions configured to cause at least one processor of at least one computer to perform steps comprising:
instantiating at least one program based on at least one program configuration;
wherein the at least one program configuration comprises:
i) at least one customizable scheduling configuration, and
ii) at least one execution step of a current execution stage of the at least one program;
receiving a current execution state of the at least one program from a state persistence storage;

determining a stage configuration of the current execution stage of the at least one program;
  wherein the stage configuration comprises:
    i) a dependency configuration,
    ii) an execution configuration,
    iii) a validation configuration, and
    iv) a rollback configuration;
  wherein the dependency configuration comprises a sequence of alphanumerical groups for locating dependencies according to pattern matching between the sequence of alphanumerical groups and a plurality of parameterized file paths associated with at least one data unit of the state persistence storage;
  wherein the plurality of parameterized file paths saved in a form of a variables map;
  wherein the dependencies comprise resources for execution of the current execution stage;
  wherein the execution configuration defines steps for executing the current execution stage;
  wherein the validation configuration defines steps for validating execution of the current execution stage;
  wherein the rollback configuration defines steps for recovering from a failed execution of the current execution stage;
determining a program execution readiness to identify when to execute the current execution stage of the at least one program associated with the current execution state based on the execution configuration and a plurality of program-specific parameterized values populated from the variables map;
  instantiating the current execution stage of the at least one program based on the program execution readiness;
  determining an execution status of the at least one execution stage based on the validation configuration;
  determining to rollback to a previous execution stage before the current execution stage based on the execution status and the rollback configuration; and
  updating the current execution state of the at least one program in the at least one data unit of the persistent storage based on the execution of the at least one state step to form a subsequent execution state of the at least one program.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
  instantiating, by at least one processor, at least one program based on at least one program configuration;
  receiving, by the at least one processor, a current state of the at least one program from a state persistence storage;
  accessing, by the at least one processor, a variables map comprising a mapping of a plurality of file paths to a plurality of alphanumerical prefixes associated with states of the at least one program;
    wherein each alphanumerical prefix represents a respective dependency;
  determining, by the at least one processor, a dependency configuration of the current state of the at least one program based at least in part on at least one alphanumerical prefix of the plurality of alphanumerical prefixes, the at least one alphanumerical prefix being associated with at least one state matching the current state; and
  executing, by the at least one processor, the at least one program in the current state based at least in part on the dependency configuration.

2. The method of claim 1, further comprising:
  searching, by the at least one processor, at least one data unit by pattern matching dependency files with the sequence of alphanumerical prefixes;
    wherein the sequence of alphanumerical prefixes comprises at least one prefix element according to a customizable configuration;
  generating, by the at least one processor, the variables map based on the sequence of alphanumerical prefixes;
  comparing, by the at least one processor, file paths and file names of the dependency files in the at least one data unit with the variables map;
  identifying, by the at least one processor, the dependencies based on matched files paths and matched file names; and
  storing, by the at least one processor, the dependency in the variables map to parameterize the current execution stage.

3. The method of claim 2, further comprising selecting, by the at least one processor, one of the matched file paths and matched file names for the sequence of alphanumerical prefixes.

4. The method of claim 1, further comprising determining, by the at least one processor, an execution configuration associated with the current state of the at least one program;
  wherein the execution configuration comprises:
    i) at least one command, and
    ii) the parameterized values populated from the variables map.

5. The method of claim 1, further comprising determining, by the at least one processor, a validation configuration associated with the current state of the at least one program;
  wherein the validation configuration comprises:
    i) one or more condition checks, and
    ii) a maximum time for determining satisfaction of the one or more condition checks.

6. The method claim 1, further comprising determining, by the at least one processor, a rollback configuration associated with the current state of the at least one program;
  wherein the rollback configuration comprises:
    i) at least one rollback command, and
    ii) the parameterized values populated from the variables map.

7. The method of claim 1, further comprising recording, by the at least one processor, for each stage of the at least one program, a run status tracking record, comprising:
  i) a name and scheduled execution time of the at least one program,
  ii) a launch time of the at least one program associated with an actual time of a launch of the at least one program;
  iii) a name of each stage of the at least one program,
  iv) a status of each stage of the at least one program,
  v) a time of instantiation of each stage of the at least one program, and vi) the variables map associated with each stage of the at least one program.

8. The method of claim 1, further comprising reattempting, by the at least one processor, to execute at least one stage of the at least one program associated with the current state upon an elapsed validation time based on a validation configuration.

9. The method of claim 1, further comprising instantiating, by the at least one processor, a first execution stage associated with the current state of the at least one program concurrently with a second execution stage associated with the current state of the at least one program.

10. The method of claim 1, wherein the current state comprises a current execution stage of a plurality of execution stages.

11. A system comprising:
at least one processor in communication with at least one non-transitory computer readable medium having software instructions stored thereon, wherein, upon execution of the software instructions, the at least one processor is configured to perform steps to:
instantiate least one program based on at least one program configuration;
receive a current state of the at least one program from a state persistence storage;
access a variables map comprising a mapping of a plurality of file paths to a plurality of alphanumerical prefixes associated with states of the at least one program;
wherein each alphanumerical prefix represents a respective dependency;
determine a dependency configuration of the current state of the at least one program based at least in part on at least one alphanumerical prefix of the plurality of alphanumerical prefixes, the at least one alphanumerical prefix being associated with at least one state matching the current state; and
execute the at least one program in the current state based at least in part on the dependency configuration.

12. The system of claim 11, wherein, upon execution of the software instructions, the at least one processor is further configured to perform steps to:
search at least one data unit by pattern matching dependency files with the sequence of alphanumerical prefixes;
wherein the sequence of alphanumerical prefixes comprises at least one prefix element according to a customizable configuration;
generate the variables map based on the sequence of alphanumerical prefixes;
compare file paths and file names of the dependency files in the at least one data unit with the variables map;
identify the dependencies based on matched files paths and matched file names; and
store the dependency in the variables map to parameterize the current execution stage.

13. The system of claim 12, wherein, upon execution of the software instructions, the at least one processor is further configured to perform steps to select one of the matched file paths and matched file names for the sequence of alphanumerical prefixes.

14. The system of claim 11, wherein, upon execution of the software instructions, the at least one processor is further configured to perform steps to determine an execution configuration associated with the current state of the at least one program;
wherein the execution configuration comprises:
i) at least one command, and
ii) the parameterized values populated from the variables map.

15. The system of claim 11, wherein, upon execution of the software instructions, the at least one processor is further configured to perform steps to determine a validation configuration associated with the current state of the at least one program;
wherein the validation configuration comprises:
i) one or more condition checks, and
ii) a maximum time for determining satisfaction of the one or more condition checks.

16. The system claim 11, wherein, upon execution of the software instructions, the at least one processor is further configured to perform steps to determine a rollback configuration associated with the current state of the at least one program;
wherein the rollback configuration comprises:
i) at least one rollback command, and
ii) the parameterized values populated from the variables map.

17. The system of claim 11, wherein, upon execution of the software instructions, the at least one processor is further configured to perform steps record for each stage of the at least one program, a run status tracking record, comprising:
i) a name and scheduled execution time of the at least one program,
ii) a launch time of the at least one program associated with an actual time of a launch of the at least one program;
iii) a name of each stage of the at least one program,
iv) a status of each stage of the at least one program,
v) a time of instantiation of each stage of the at least one program, and
vi) the variables map associated with each stage of the at least one program.

18. The system of claim 11, wherein, upon execution of the software instructions, the at least one processor is further configured to perform steps to reattempt to execute at least one stage of the at least one program associated with the current state upon an elapsed validation time based on a validation configuration.

19. The system of claim 11, wherein, upon execution of the software instructions, the at least one processor is further configured to perform steps to instantiate a first execution stage associated with the current state of the at least one program concurrently with a second execution stage associated with the current state of the at least one program.

20. The system of claim 11, wherein the current state comprises a current execution stage of a plurality of execution stages.

* * * * *